Patented Oct. 5, 1943

2,330,858

UNITED STATES PATENT OFFICE 2,330,858

LUBRICANT

John A. Anderson, Olympia Fields, Ill., assignor to Standard Oil Company, Chicago, Ill., a corporation of Indiana No Drawing. Application August 31, 1936,
Serial No. 98,733

6 Claims. (Cl. 252—45)

This invention relates to improvements in lubricants, and in particular, to addition agents for improving lubricating characteristics of lubricating oil and the like.

It is well known in high grade lubricants that a relatively small change in the viscosity of the oil with an increase of temperature is desirable. In other words, it is advantageous for the oil to have a relatively flat viscosity temperature curve or a high viscosity index as defined by Dean and Davis (Chemical and Metallurgical Engineering 36, page 618). An oil having a high viscosity index possesses the property of decreasing less in viscosity with a rise in temperature than an oil having a low viscosity index.

It is also desirable that a high grade lubricating oil be capable of effectively and adequately lubricating certain types of gears and other mechanisms which operate under extremely high pressures, pressures under which ordinary lubricating oils would not provide adequate lubrication.

It is, therefore, an object of this invention to provide a lubricating oil having a high viscosity index.

It is another object of this invention to provide a lubricant which will adequately lubricate mechanisms operating under extremely high pressures.

Other objects and advantages of this invention will become apparent from the following description.

I have found it possible to accomplish the foregoing objects by adding to ordinary lubricating oils a sulfurized, synthetic, viscous, plastic, high-molecular weight hydrocarbon resin. These resins, which may be produced by the polymerization of certain olfinic hydrocarbons under appropriate conditions as hereinafter set forth, have high average molecular weights ranging from 1000 to 15,000 and preferably from 1500 to 15,000. They are essentially saturated hydrocarbons in their chemical composition and reactions, although their empirical formula is approximately $C_nH_{2n}$.

The resins can be produced in various ways from various materials by polymerization, and/or condensation, and although they differ somewhat depending on the method of manufacture, they possess the same general properties as described.

The preferred resin is made by the polymerization of isobutylene with aluminum chloride or preferably boron trifluoride. In making this resin it is desirable to carry out the polymerization at a low temperature, for instance below 0° F. and preferably from —40° F. to —100° F. or even lower. The polymerization reaction may be carried out in the presence of a solvent such as naphtha, hexane, pentane, butane or propane, which acts as an inert diluent and facilitates handling the viscous product and cooling the reaction. Other unsaturated hydrocarbons can also be polymerized to make resins suitable for my purpose. Among these may be mentioned isopropyl ethylene, normal butylene and other mono-olefins. Branched chain, and particularly iso-mono-olefins are preferred.

In my preferred example I treat isobutylene in the presence of an equal volume of butane at a temperature of —80° F., with about 0.1% to 0.5% by weight of boron trifluoride. Thus, the isobutylene which is liquid at —80° F. can be held in a vessel surrounded by a refrigerating bath and boron trifluoride gas can be led in with constant stirring until the desired plastic, viscous resin is produced. The reaction under these conditions is complete within a few minutes and produces a resin having a degree of plasticity which is usually highly desirable in connection with my invention. The reaction product may be obtained by warming to remove butane and unreacted boron fluoride, neutralized and washed with water.

The high molecular weight hydrocarbon resin obtained in the foregoing manner is then sulfurized by heating the same with 1 to 25% and preferably 5 to 10% sulfur for about 2 to 8 hours at a temperature of about 200 to 450° F. and preferably 300° F. Although the resin may be sulfurized without the addition of a diluent I prefer to increase the fluidity of the resin by adding a sufficient quantity of mineral oil thereto. Mineral lubricating oils having a Saybolt viscosity between 90 and 300 seconds at 100° F. may be suitably used.

I have found that the sulfurized synthetic resin prepared in the foregoing manner when added to mineral lubricating oils materially increases the viscosity index of the oil. Thus an S. A. E. 10 lubricating oil having a Saybolt viscosity at 100° F. and 210° F. of 168 seconds and 45 seconds respectively or a viscosity index of 101, will, when compounded with 2% of my sulfurized synthetic resin have a Saybolt viscosity at 100° F. and 210° F. of 227 seconds and 50 seconds respectively or a viscosity index of 118.

The following is another example of the improvement in the viscosity index effected by the sulfurized synthetic resin. A Winkler oil having a Saybolt viscosity at 100° F. and 210° F of 221 and 45 seconds respectively, or a viscosity index of 37 will, upon the addition of about 15% of my sulfurized synthetic resin, have a Saybolt viscosity at 100° F. and 210° F. of 900 and 87 seconds respectively or a viscosity index of 102.

The addition of sulfurized synthetic resins of the hereinbefore described type to a lubricating oil not only effects a substantial improvement in the viscosity index of the oil, but a decided improvement in the E. P. property of the oil is also effected. By the E. P. property of a lubricating oil I mean the property of a lubricating oil to adequately lubricate bearing surfaces under extreme pressure. One of the accepted tests to determine the E. P. property of a lubricating oil is the so-called Timken test which is determined on the Timken lubricants which is described as U. S. Patent 1,990,771. The test consists essentially of rotating a hardened and ground flat steel ring, mounted on a spindle, against a hardened and ground flat steel test block. A stream of the lubricant to be tested is applied over the line of contact between the ring and the test block while the tester is operated at speed of 800 R. P. M. with a steady bearing load of about 20,000 pounds per square inch for ten minutes. The load is obtained by applying a total weight of 33 pounds to the lever arm. Determinations are made from the appearance of the test block surface at the end of the run. A lubricant is rejected when it fails to prevent scoring and galling with a lever load of 33 pounds applied for 10 minutes.

The results tabulated below definitely show the improvement in E. P. characteristics affected by the addition of my sulfurized synthetic resin to lubricating oils.

*Timken E. P.*

| | | Test, pounds | |
|---|---|---|---|
| | | Passed | Failed |
| A | Winkler oil (1.5% sulfur) | | 15 |
| B | Winkler oil plus 12% by weight of isobutylene resin | | 15 |
| C | Winkler oil plus dissolved sulfur (2.7% total sulfur) | 20 | 25 |
| D | Winkler oil plus 15% sulfurized isobutylene resin (2.4% total sulfur) | 33 | 35 |

The oil tested was a Mid-Continent oil of 220 seconds Saybolt at 100° F. containing about 1.5% sulfur. This oil failed to pass the test with only 15 pounds on the lever arm. The same oil with 12% of an unsulfurized synthetic resin showed no improvement while the addition of about 15% of a sulfurized synthetic resin containing 2.4% total sulfur enabled the oil to readily pass the test. It should be noted that the oil with 1.2% dissolved sulfur giving a total sulfur content of 2.7% failed to pass the test although sulfur is one of the well recognized addition agents in E. P. lubricants.

While I have described my invention in connection with certain preferred embodiments thereof and in connection with specific examples, it is to be understood that these are by the way of illustration rather than by the way of limitation and I do not mean to be bound thereby, but only by the appended claims.

I claim:

1. A lubricant comprising a mineral oil and a sulfurized high molecular weight mono-olefin polymer, said sulfurized mono-olefin polymer being obtained by heating a mono-olefin polymer having a molecular weight above about 1000 with elemental sulfur at a sufficiently high temperature to bring about reaction between the polymer and the sulfur.

2. A lubricant comprising a mineral oil and a sulfurized high molecular weight iso-mono-olefin polymer said sulfurized iso-mono-olefin polymer being obtained by heating an iso-mono-olefin polymer having a molecular weight above about 1000 with elemental sulfur to a temperature above about 200° F., and for a period of time sufficient to bring about reaction between the polymer and the elemental sulfur.

3. A lubricant comprising a mineral oil and a sulfurized high molecular weight isobutylene polymer prepared by heating an isobutylene polymer having a molecular weight above about 1000 with elemental sulfur at a temperature of about 200° F. and higher for a period of time sufficient to bring about reaction between the polymer and the elemental sulfur.

4. A lubricant comprising a lubricating oil and a sulfurized high molecular weight mono-olefin polymer, said sulfurized mono-olefin polymer being obtained by heating a mono-olefin polymer having a molecular weight above about 1000 with elemental sulfur at a sufficiently high temperature to bring about reaction between the polymer and the sulfur.

5. A lubricant comprising a lubricating oil and a sulfurized high molecular weight iso-mono-olefin polymer said sulfurized iso-mono-olefin polymer being obtained by heating an iso-mono-olefin polymer having a molecular weight above about 1000 with elemental sulfur to a temperature above about 200° F., and for a period of time sufficient to bring about reaction between the polymer and the elemental sulfur.

6. A lubricant comprising a lubricating oil and a sulfurized high molecular weight isobutylene polymer prepared by heating an isobutylene polymer having a molecular weight above about 1000 with elemental sulfur at a temperature of about 200° F. and higher for a period of time sufficient to bring about reaction between the polymer and the elemental sulfur.

JOHN A. ANDERSON.